Nov. 5, 1929.   A. MOORHOUSE   1,734,268
PROPELLER SHAFT AND METHOD OF MAKING
Filed Nov. 27, 1925
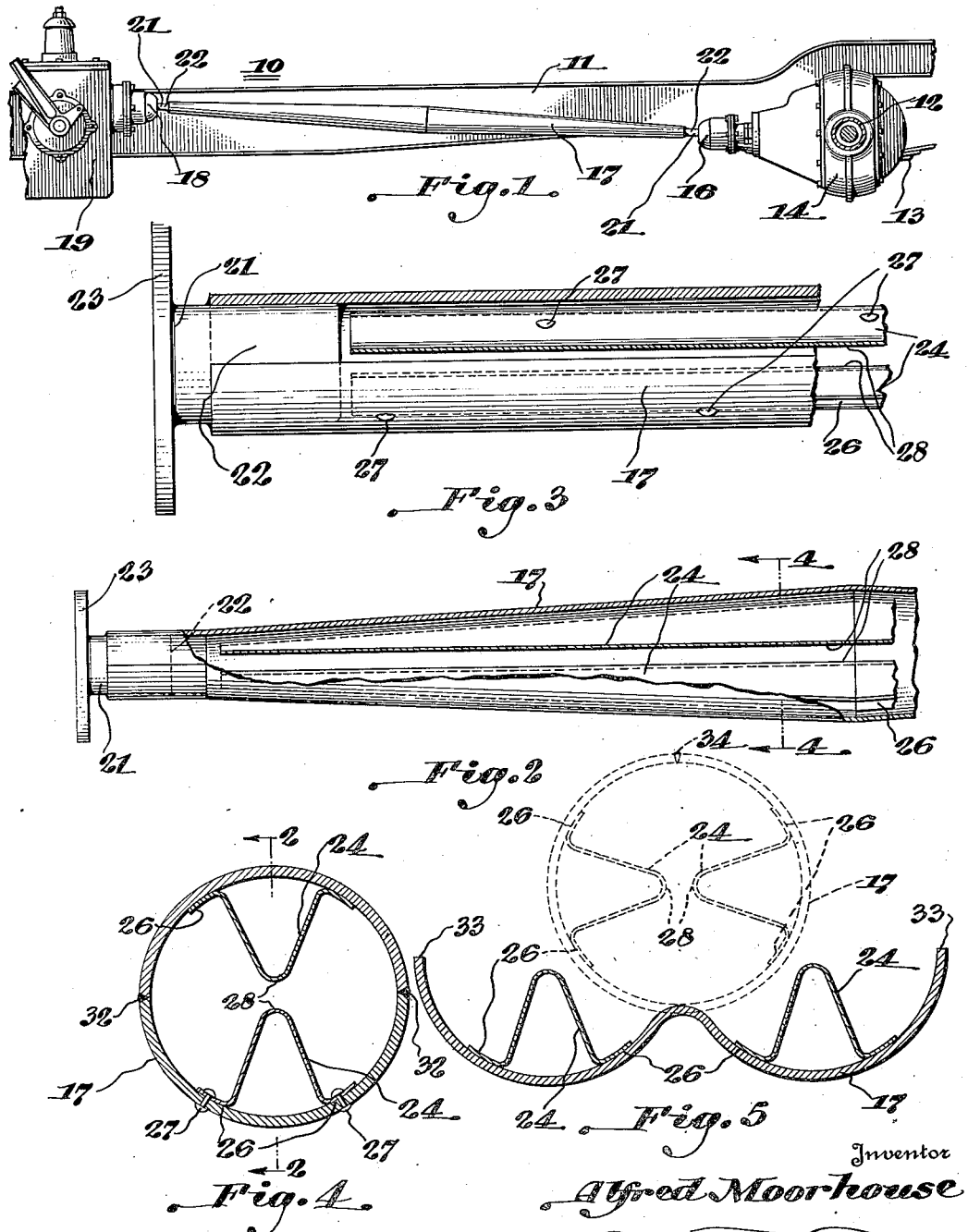
Inventor
Alfred Moorhouse
By Milton Tibbetts
Attorney Patented Nov. 5, 1929

1,734,268

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

PROPELLER SHAFT AND METHOD OF MAKING

Application filed November 27, 1925. Serial No. 71,612.

This invention relates to motor vehicles, particularly to the propeller shafts of such vehicles, and to a method of making shafts of this nature.

It has for one of its objects to provide such a propeller shaft which shall be light and strong, which shall be sufficiently stiff to resist lateral vibration or whipping at all vehicle speeds and loads, and which shall not be expensive to manufacture.

Another object is to provide a practicable method for the manufacture of such shafts.

Other objects of the invention will appear from the following description taken in connection with the drawing, which forms a part of this specification, and in which:

Fig. 1 is a portion of the chassis of a motor vehicle partially in side elevation and partially broken away, having a propeller shaft constructed in accordance with the invention.

Fig. 2 is a view partially in side elevation and partially in longitudinal section through a propeller shaft, substantially on the line 2—2 of Fig. 4;

Fig. 3 is a view similar to Fig. 2, through a propeller shaft of slightly modified form;

Fig. 4 is a section substantially on the line 4—4 of Fig. 2, and

Fig. 5 is a view in section illustrating one method of applying the stiffening members, the dotted lines showing the completed shaft.

It has been found that the tubular propeller shafts now in common use to connect the transmission gearing in the final drive gearing of motor vehicles, although considerably stiffer than the solid shafts previously in use, frequently give considerable trouble from lateral vibration or whipping, especially at the higher vehicle speeds. Such vibration not only gives an unpleasant sensation to the occupants of the vehicle but it causes serious damage to the bearings of the universal joints and the rear axle gear.

By the present invention is provided both a propeller shaft in which the stiffness is greatly increased without excessive weight or bulk, and a method for easily and inexpensively manufacturing such shafts.

Referring to the drawing, at 10 is shown a portion of a motor vehicle chassis having frame members 11 supported from a rear axle 12 through vehicle springs 13 in the usual manner. The vehicle 10 is provided with appropriate differential and drive gearing (not shown) adapted to drive the shafts of the rear axle 12 and enclosed in a suitable housing 14. This gearing is driven through a universal joint 16 by a propeller shaft 17, connected at its forward end through another universal joint 18 to suitable transmission gearing, located in a gear case 19 and driven from the vehicle engine in a manner well known in the art to which this invention relates. The propeller shaft 17 is of tubular construction and is provided at its ends with suitable heads 21, having neck portions 22 rigidly secured to the tubular portion of the shaft 17 as by welding therein, and having flange portions 23 adapted for connection to the universal joints 16 and 18 in the well known manner. Interiorly of the tube 17 and longitudinally disposed therein are stiffening members 24 which may be of any desired shape but which are illustrated in the present embodiment of the invention as V-shaped in cross section. These stiffening members or ribs 24 may be conveniently formed by stamping from sheet metal, and are preferably provided with marginal flanges 26 adapted to be rigidly secured to the walls of the tube 17 in any convenient manner, as by the rivets 27, or by welding.

It will be evident that the stiffness of the tubular shaft 17 against lateral or beam stresses is enormously increased by the ribs 24, two of which are preferably used, arranged symmetrically and diametrically opposite within the tube, their ridges 28 being in juxtaposition.

The reinforced tubular shaft just described may be, and preferably is of varying cross section, being tapered from its central plane toward each end so that the sectional diameter is greatest at the center of the shaft and is least at the end thereof. If desired, the stiffening members or ribs may be made of varying depth being more shallow at the ends of the shaft where the diameter is least than at the middle thereof where the diameter is greatest. This longitudinal variation of depth of the members 24 is preferably made to correspond to the taper of the shaft so that the ridges 28 remain parallel to the shaft axis.

This shaft may be formed by initially stamping two longitudinal halves therefor in a suitable die of any well known construction, the taper being conveniently formed during this operation. One of the stiffening members 24 is then permanently secured to each of the halves, as by the rivets 27, by welding, or in any other desired manner. The halves are then placed in position and are welded along their cooperating meeting edges, as indicated at 32, to form the complete shaft.

In Fig. 5 is illustrated another method of construction, in which the initial stamping is formed in a single piece having two curved, trough-shaped portions each adapted to form a half of the shaft. This stamping is shown in section in Fig. 5 in full lines, and after it has been initially formed in substantially the shape shown, one of the stiffening members 24 is welded or riveted to each of the portions or halves. The stamping is then bent to bring the cooperating edges 33 into engagement, as illustrated in the dotted lines in Fig. 5, and these edges are then welded, as indicated at 34, to form the completed shaft.

In Fig. 3 is shown a form of shaft in which the tubular portion is of cylindrical formation, the taper being omitted. This shaft is preferably manufactured in the same manner as that already described, the trough-shaped portions being formed in semi-cylindrical dies having no taper. While this form of shaft is probably not as strong for a given weight as the tapered construction shown in the preferred embodiment, it has the advantage that it may be manufactured in less expensive stamping apparatus, and it is also somewhat less bulky on the vehicle.

It will be understood that various forms of the invention other than those described above may be used without departing from the spirit or scope of the invention.

I claim:

1. A tubular shaft formed of cooperating stampings each semi-circular in cross section and welded together, each said section tapered from its central portion toward each end and a longitudinally disposed stiffening member permanently secured thereto within said shaft.

2. A tubular shaft formed of cooperating stampings each semi-circular in cross section and welded together, each said section tapered from its central portion toward each end and longitudinally disposed stiffening members permanently secured to the inner face thereof.

3. A tubular shaft formed of cooperating stamped members each semi-circular in cross section and welded together, each said member having a longitudinally disposed stiffening rib substantially V-shaped in cross section and having marginal flanges permanently secured to the said member.

4. A tubular shaft formed of cooperating members each semi-circular in cross section and welded together, each said member having a longitudinally disposed stiffening rib substantially V-shaped in cross section and having marginal flanges, and means rigidly attaching said flanges to the inner face of said member.

5. A propeller shaft for a motor vehicle comprising a tube tapered from its mid portion toward each end and having stiffening members of V-shaped section rigidly secured therein, the ridges of said stiffening members being parallel to the axis of the shaft.

6. A propeller shaft for motor vehicles comprising a tube tapered from its mid portion toward each end and having longitudinally disposed stiffening ribs rigidly fastened therein, said ribs being of decreasing depth from the mid portion of the shaft toward each end thereof.

7. The method of forming a tubular shaft which consists in stamping trough-shaped portions therefor of semi-circular section, then in securing stiffening members longitudinally of the inner face of each said portion and then in welding the edges of said portions together.

8. The method of making a propeller shaft for motor vehicles which consists in first forming a pair of trough-shaped members to constitute the halves of the shaft, then in welding to the inner face of each of said members a stiffening rib, and finally in welding together the cooperating edges of said trough-shaped members to form the complete shaft.

9. The method of making a propeller shaft which consists in first stamping a blank for said shaft into trough-shaped portions, then in permanently securing to each said portion a stiffening member, then in bending the stamping into final shape, and finally in welding the longitudinal edges of said stamping together.

10. The method of making a shaft which consists in first stamping a blank with portions to form the longitudinal halves of the shaft then in rigidly securing to each portion a longitudinal stiffening member, then in putting the said portions into juxtaposition, and finally in permanently securing the edges of the portions together.

In testimony whereof I affix my signature.

ALFRED MOORHOUSE.